UNITED STATES PATENT OFFICE.

LAY H. EVERHART, OF DECATUR, GEORGIA.

METHOD OF PROTECTING MATERIALS FROM ATTACKS OF DESTRUCTIVE ORGANISMS.

1,182,760. Specification of Letters Patent. Patented May 9, 1916.

No Drawing. Application filed November 5, 1915. Serial No. 59,835.

*To all whom it may concern:*

Be it known that I, LAY H. EVERHART, a citizen of the United States, residing at Decatur, in the county of Dekalb and State of Georgia, have invented certain new and useful Improvements in Methods of Protecting Materials from Attacks of Destructive Organisms; and I do hereby declare the following to be a full, clear, and exact description of the invention, such as will enable others skilled in the art to which it appertains to make and use the same.

My invention relates to a process for protecting material, particularly material of organic character, from the attacks of destructive organisms whether animal or vegetable in character. The material may be either of animal or vegetable origin.

Particularly my invention relates to the treatment of wooden objects so as to render them immune to the attacks of parasites, molds, fungi, insects, etc. Wooden objects are particularly liable to be attacked by fungi, barnacles, and especially worms, fleas and other animals when in tropical waters. Some of these break down the tissue of the wood itself and permit it to crumble; others, like the teredo, penetrate into the material of, for instance, piles, and soon honeycomb and wreck the woody structure.

My process is also applicable to treatment of objects on land, such as posts, railroad ties, sleepers, etc. It may be applied to objects made of fiber, and to leather.

It has long been known that arsenic is a poison to all growth of an animal origin. It is also inimical to many vegetable growths. Arsenic compounds cannot be applied to objects to be immersed in water because the arsenic is liable to be slowly dissolved and washed away. Likewise, when applied to objects on land and exposed to weather, the arsenic is liable to be washed away by the same agents to places where it is not desired, or where it is harmful to man.

I have found that by coating or impregnating an object with a soluble arsenical compound such as sodium arsenate, and subsequently treating the object so coated with a solution of lead acetate, either the basic or the neutral acetate, I get a precipitate upon or within the pores of the object, of plumbic arsenate. This salt is practically insoluble in water, but is attackable by the acid juices of most marine growths, particularly fleas and sea worms. It thus becomes poisonous to these creatures, and thus preserves the wood from their attacks.

My preferred way of carrying out my process is to saturate the object of wood with the sodium arsenate applied in comparatively dilute solution, so that the salt may penetrate as far as practicable toward the interior of the wood. If the compound is applied in a solution that is much concentrated, the penetration may not be great enough to be effective, that is to say the precipitation which follows upon the addition of the plumbic acetate may occur so abundantly near the surface that penetration toward the inner part of the wood is prohibited.

Instead of sodium arsenate I may use sodium arsenite, and instead of sodium salt I may use an arsenate salt of any other of the alkali metals. In fact I may use any soluble arsenic salt of a strong base. I am, moreover, not limited to lead acetate, as I may use some other soluble salt of lead, such as the nitrate; the compounds which I have indicated above, are, however, the cheapest and best at present available.

The arsenic component of the sodium arsenate, that is, the acid, leaves that base to go to the lead base of the plumbic acetate. The sodium acetate formed is very soluble, and is, of course, readily washed away. The reaction which occurs is as follows:

In the case of neutral lead acetate—

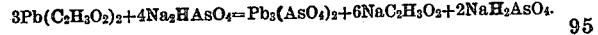
$3Pb(C_2H_3O_2)_2 + 4Na_2HAsO_4 = Pb_3(AsO_4)_2 + 6NaC_2H_3O_2 + 2NaH_2AsO_4.$ In the case of basic lead acetate—

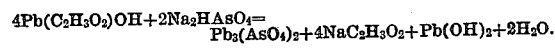
$4Pb(C_2H_3O_2)OH + 2Na_2HAsO_4 = Pb_3(AsO_4)_2 + 4NaC_2H_3O_2 + Pb(OH)_2 + 2H_2O.$ Instead of relying upon the treatment with the lead acetate to effect precipitation of the poisonous lead arsenate, I may omit, in some instances, the use of a lead acetate and depend upon the precipitating effect of certain calcium and magnesium compounds, the chlorids, for instance, found in sea water. These reacting with the sodium arsenate form insoluble and poisonous compounds, such as calcium arsenate and magnesium arsenate, the poison of which is released in a minute degree by the natural digestive juices of certain forms of marine life. This is uncertain, however, as compared with the treatment first given. I may, in certain instances, also reverse the order of application; that is, I may apply the lead acetate first and effect the reaction by means of the sodium arsenate applied later.

I may accelerate and increase the degree of saturation of the wood by employing any of the usual means. I may conduct the process in a vacuum, or under pressure, or both. I may use heat. I may, if I desire, subject the wood to a preliminary treatment, adapted to open up the pores by removing, to some extent at least, the natural resins and oils of the wood. I may also use a spray or a brush.

The lead arsenate which is thus precipitated in the pores of the wood is composed of two poisons; the base, lead, forming poisonous compounds with many acids, and the acid being also violently poisonous in many compounds. I thus increase to some extent the poisonous quality of the arsenic.

Instead of a lead salt I may use soluble salt of some other heavy metal, such as tin or copper. While it is desirable that the heavy metal be one whose salts are poisonous in character, it is not absolutely necessary. Phosphoric acid salts might, in some instances replace the arsenic salts. Antimony or bismuth may also replace the arsenic at times.

The basic object of my process is to precipitate in the pores of the wood themselves, an insoluble poisonous compound of such a nature as to be inimical to the attacks of destructive organisms. Lead and arsenic seem to be the best. Others may do.

Having thus described my invention, what I claim as new and desire to secure by Letters Patent is:

1. The process of protecting organic tissue from the attacks of destructive organisms, which consists in subjecting said tissue to treatment with a soluble arsenical compound, and then effecting precipitation of an arsenical compound of lead by subjecting said tissue so treated to treatment with a soluble lead compound capable of reacting with the soluble arsenical compound to produce an arsenical compound of lead insoluble in water but attackable by the natural juices of said organisms.

2. The process of protecting organic tissue from the attacks of destructive organisms, which consists in subjecting said tissue to treatment with sodium arsenate and then to treatment with a soluble lead salt capable of reacting with the sodium arsenate to produce an arsenical compound of lead insoluble in water but attackable by the natural juices of said organisms.

3. The process of protecting organic tissue from the attacks of destructive organisms, which consists in subjecting said tissue to treatment with sodium arsenate and then to treatment with neutral lead acetate whereby lead arsenate is precipitated.

4. The process of protecting organic tissue from the attacks of destructive organisms which consists in subjecting said tissue to treatment with sodium arsenate and then to treatment with lead acetate whereby lead arsenate is precipitated.

5. The method of preserving wood from attacks of destructive marine organisms, which consists in impregnating said wood with an arsenate of an alkali metal, and subjecting the wood so impregnated to treatment with a lead acetate whereby insoluble plumbic arsenate is precipitated in the pores of said wood.

6. The method of preserving wood from attacks of destructive marine organisms, which consists in impregnating said wood with an arsenate of an alkali metal, and subjecting the wood so impregnated to treatment with a neutral lead acetate whereby insoluble plumbic arsenate is precipitated in the pores of said wood.

In testimony whereof, I affix my signature.

LAY H. EVERHART.